United States Patent

Kessler

(10) Patent No.: US 6,820,196 B2
(45) Date of Patent: Nov. 16, 2004

(54) FLASH MEMORY INITIALIZATION IN A DTV SET-TOP BOX

(75) Inventor: Damien Kessler, San Jose, CA (US)

(73) Assignees: Sony Corporation (JP); Sony Electronics Inc., Park Ridge, NJ (US)

(*) Notice: Subject to any disclaimer, the term of this patent is extended or adjusted under 35 U.S.C. 154(b) by 649 days.

(21) Appl. No.: 09/827,952

(22) Filed: Apr. 9, 2001

(65) Prior Publication Data

US 2002/0147989 A1 Oct. 10, 2002

(51) Int. Cl.[7] .................................. G06K 15/177
(52) U.S. Cl. ............................... 713/1; 713/2
(58) Field of Search ..................... 713/1, 2, 100; 714/55

(56) References Cited

U.S. PATENT DOCUMENTS

| | | | | |
|---|---|---|---|---|
| 4,479,194 A | * | 10/1984 | Fogg et al. ............... | 235/386 |
| 5,717,428 A | * | 2/1998 | Barrus et al. ............. | 345/168 |
| 6,370,603 B1 | * | 4/2002 | Silverman et al. ......... | 710/72 |
| 6,584,587 B1 | * | 6/2003 | McDermott ............... | 714/55 |

FOREIGN PATENT DOCUMENTS

| | | | | |
|---|---|---|---|---|
| JP | 09305269 A | * | 11/1997 | ........... G06F/1/24 |

OTHER PUBLICATIONS

"Operational Surveillance Function" IBM Technical Disclosure Bulletin, Sep. 1, 1994, US, pp. 217–218.*

* cited by examiner

Primary Examiner—Lynne H. Browne
Assistant Examiner—Paul Yanchus, III
(74) Attorney, Agent, or Firm—Rader, Fishman & Grauer PLLC; Ronald P. Kananen

(57) ABSTRACT

A flash memory initialization sequence in a DTV set-top box of the type having a program-controlled microprocessor associated with a front panel board and a DTV board for processing at least part of an audio/visual television signal in which the sequence, upon application of start-up power, determines whether or not a selected file exists indicative of at least a partial formatting of the flash memory and causes the main DTV application to execute in the event the selected file exists. Conversely, where the selected file is not detected, the initialization sequence runs an initialization routine that at least formats a portion of the flash memory, thereafter creates the selected file indicative of the desired formating of the flash memory, and returns control to re-determine whether or not the selected file exists to cause the main DTV application to then execute.

5 Claims, 3 Drawing Sheets

FLASH MEMORY INITIALIZATION IN A DTV SET-TOP BOX

BACKGROUND OF THE INVENTION

The present invention relates to memory initialization in a set-top box of the type used in consumer/home applications for processing audio/video signals, including signals provided by cable and, more particularly, to software/firmware for providing an improved initialization sequence for flash memory used in the set-top box.

Set-top boxes (STB) are a common electronic device in many homes and are used to process televisions signals provided, for example, from a cable, into various consumer devices, particularly television sets. In general, set-top boxes include signal processing devices to process the particular digital (and/or analog) audio and/or video signals, one or more microprocessors that handle supervisory and control functions, and one or more volatile and non-volatile memories designed to store short-term and long-term information. The microprocessors are controlled by firmware that includes control sequences and sub-sequences for all the functions provided by the set-top box.

An exemplary known set-top box STB manufactured by the Sony Corporation of Tokyo, Japan for the processing of digital television (DTV) signals includes a DTV board that includes, among other devices, a microprocessor and an associated non-volatile memory that stores various user settings and other operating parameters. Additionally, the set-top box includes a front-panel board that includes a register for recording or otherwise storing user command key presses, and, like the DTV board, includes a microprocessor. Lastly, the set-top box STB typically include another board having a tuner and a down-converter.

In the particular implementation described above, user settings and various operating parameters are stored in a non-volatile memory using conventional file system structures. In general, flash-type memories are commonly used as the non-volatile memory. Flash memories are generally of the type in which charges are supplied to or removed from a floating gate in order to alter the threshold characteristics of the memory cell as a way of storing information. These memories are non-volatile in the sense that the individual memory cells retain their memory state when power is removed, need not be refreshed on a periodic basis by refresh circuitry, and all the memory cells can be erased simultaneously by momentary application of selected voltage potentials.

One problem associated with the use of file system structures to hold operating information is that the memory must be correctly initialized in advance of any data writes in order to be usable by the DTV application. The memory must be write-protected against involuntary write operations, and the section of the flash section where the information is to be stored must be appropriately formatted. In general, protection/formatting is performed only once, when the set-top box is turned on for the first time. The above-described set-top box does not both function to initialize the flash memory and thereafter start the DTV application; the flash initialization application and the DTV application are not compatible and cannot be run consecutively. Thus, the set-top box must be subject to a less-than optimal re-set after initializing the flash memory in order to re-start the DTV application.

SUMMARY OF THE INVENTION

In view of the above, it is an object of the present invention, among others, to provide flash memory initialization in a set-top box of the type that processes digital television signals that, upon start-up, determines whether or not the flash memory has been previously initialized.

It is another object of the present invention to provide flash memory initialization in a set-top box in which the set-top box functions in its normal signal processing mode where the flash memory has been previously initialized.

It is still another object of the present invention to provide flash memory initialization in a set-top box in which the set-top box effects initialization of the memory when necessary prior to function in its normal signal processing mode where the flash memory has not been previously initialized.

In view of these objects, and others, the present invention provides a flash memory initialization sequence in a set-top box of the type having a program-controlled microprocessor and a DTV board for processing at least part of an audio/visual television signal in which the sequence, upon application of start-up power, determines whether or not a selected file exists indicative of at least a desired partial formatting or other initialization of the flash memory. In the event the selected file exists, the main DTV application thereafter starts and runs normally. Conversely, where the selected file is not detected, the initialization sequence runs an initialization routine that at least formats a portion of the flash memory, thereafter creates a selected file indicative of the formatting of the flash memory, and returns control to re-determine whether or not the selected file exists and to then cause the main DTV application to run.

The present invention advantageously provides a flash memory initialization arrangement in a DTV set-top box that efficiently assures reliable operation of the DTV application.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

The present invention is used in the context of a set-top box for accepting input signals, such as cable-provided audio/video digital television (DTV) signals, and processing those signals for use in TV receivers or similar devices in the home/consumer context. The architecture of such a set-top box includes a 'DTV board' that provides overall input/output signal processing and executes a DTV application, and a 'front panel' board that includes a microprocessor that effects control and supervisory functions, and a command interface with the user. Other components of the set top box include a 'tuner' board with a down-converter and one or more decoders, etc. A microprocessor is provided as part of the 'front panel', board and is driven by a software/firmware instruction set, including a boot-up sequence, to provide control and supervisory functions. A non-volatile flash memory is provided as part of the DTV board to store user defaults, auto programming tables, and the like. The command interface can include one or more button-press features on a remote unit by which button-press commands can be entered by the user or one or more button-press features on the set top box itself. The basic architecture of the set-top box in which this invention is embodied is described in co-filed U.S. patent application (Docket—50P3933/ SOA332) entitled "Improved Memory Utilization for a Set Top Box," the disclosure of which is incorporated herein by reference.

Figure 1:
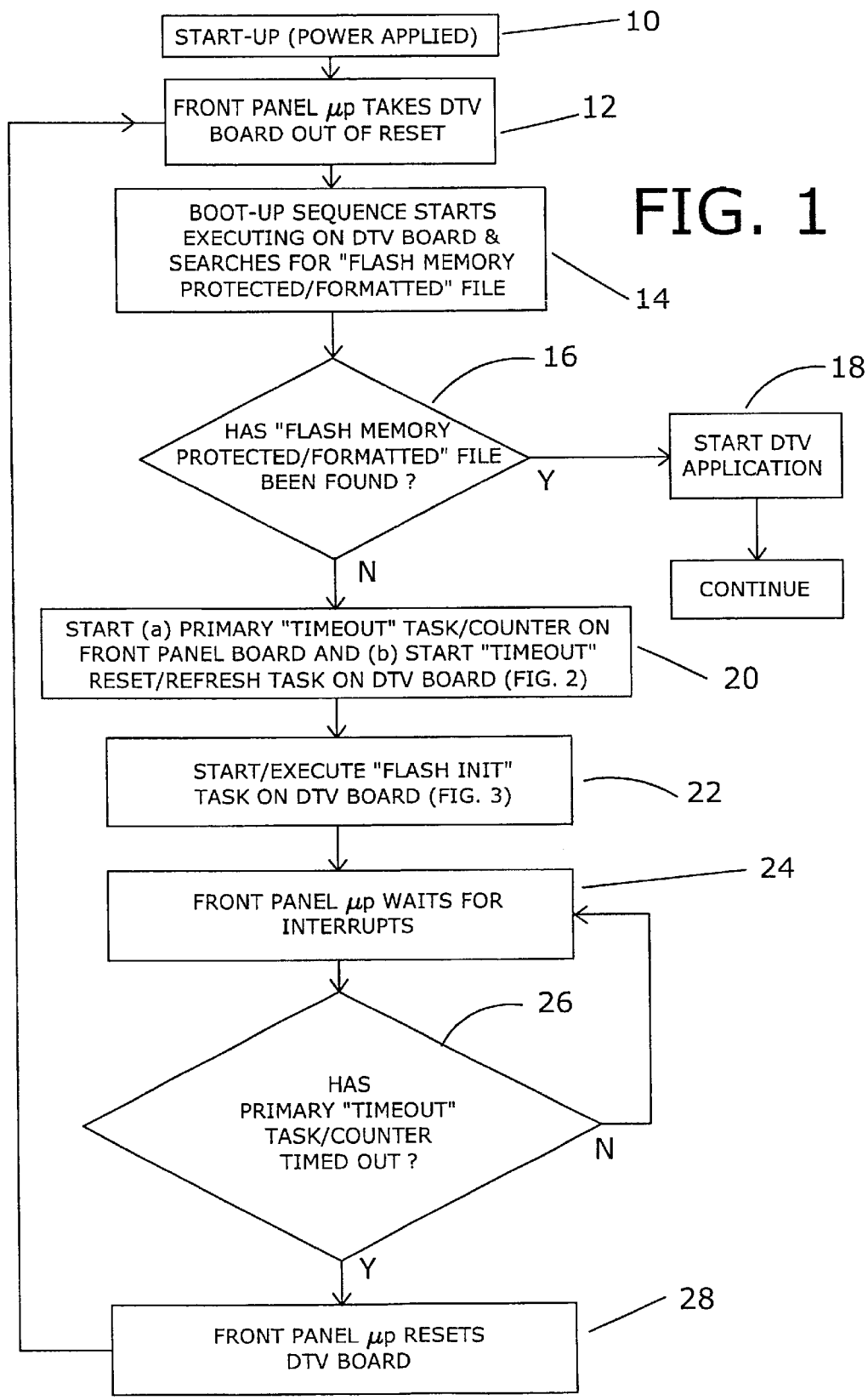
FIG. 1 is a flow diagram of the flash memory initialization protocol in accordance with the present invention.

The flash memory handling protocol in accordance with the present invention is shown in FIG. 1 and starts in response to the application of start-up power in function block 10. Upon the application of start-up power, the boot-up firmware specific to the front panel microprocessor takes the DTV board out of re-set in function block 12. Subsequently, in function block 14, a search is conducted to determine the presence or existence of a "flash memory protected/formatted" file in the nonvolatile flash memory on the DTV board. The existence of the "flash memory protected/formatted" file indicates that the flash memory has been properly initialized, and, conversely, the absence of the "flash memory protected/formatted" file indicates a need to initialize or re-initialize the memory.

A query in decision block 16 is presented as to whether or not the "flash memory protected/formatted" file exists.

If the "flash memory protected/formatted" file exists, the program flow branches to the start DTV application of function block 18 with the DTV application continuing to run to provide the DTV function to the user.

In the event the "flash memory protected/formatted" file cannot be found by the query in decision block 16, (i.e., the file does not exist), a primary "timeout" task/counter sequence is initiated in function block 20 by the microprocessor on the front panel board. As explained in more detail below in relationship to FIG. 2, the primary "timeout" task/counter sequence is set with a timeout value "M" of, for example, about four seconds. However, the primary "timeout" sequence is periodically re-set or re-started at some interval "N" (for example, two seconds) by a refresh/re-set task on the DTV board to maintain the primary "timeout" function on the front panel board active (i.e., not timed out) until, as explained below, the primary "timeout" function is terminated or halted and times out as a consequence of the creation of the desired "flash memory protected/formatted" file or a failure of the firmware/software associated with the DTV board to execute (i.e., a DTV board "crash" or "freeze").

Figure 2:
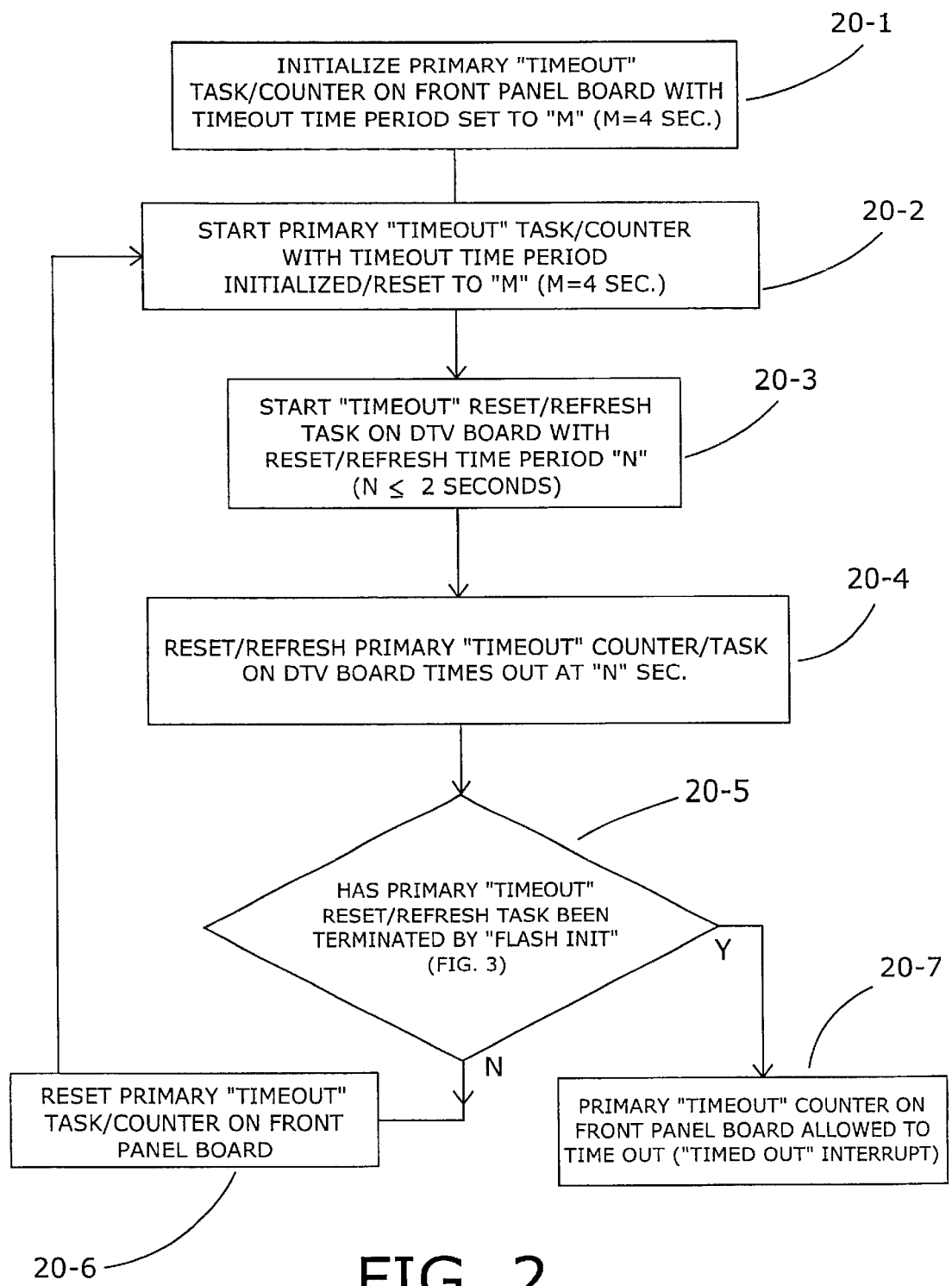
FIG. 2 is a flow diagram of a timeout task/counter and associated re-set/refresh loop utilized by the flow sequence of FIG. 1.

An exemplary primary "timeout" function 20 is shown in FIG. 2. As shown therein, (function block 20-1) a primary "timeout" task/counter (associated with the front panel board) is initialized to some timeout value "M" (i.e., about 4 seconds maximum). In function block 20-2, the primary "timeout" task/counter is started and begins to time out. Concurrently therewith or shortly thereafter in function block 20-3, a "timeout" re-set/refresh task on the DTV board with a re-set/refresh time period "N" (i.e., 2 seconds) is started. In function block 20-4, the time period "N" times outs and, in decision block 20-5, a query is presented as to the presence or absence of a "timeout termination" command or indication. As explained below in relationship to FIG. 3, a "timeout termination" is provided after the successful creation of the "flash memory protected/formatted" file. If the "timeout termination" command or indication is not present or detected, the sequence of FIG. 2 re-sets (in function block 20-6) the primary "timeout" task/counter to its originally initialized period M (i.e., 4 seconds) and restarts the primary "timeout" task/counter. Conversely, if the "timeout termination" command or indication is present, the sequence of FIG. 2 does not re-set the primary "timeout" task/counter and the primary "timeout" task/counter merely times out at the end of the "M" timeout period to generate a 'timed out' interrupt (function block 20-7).

Thus, the sequence of FIG. 2 continues to cycle through successive two-second re-sets of the four-second primary "timeout" task/counter until a "timeout termination" is detected (indicating, as discussed below in relation to FIG. 3, that the desired "flash memory protected/formatted" file has been created) after which the primary "timeout" task/counter is allowed to time out to generate a 'timed out' indication or interrupt (utilized by the flow sequence of FIG. 1 as discussed below).

As shown in FIG. 1, once the primary "timeout" task/counter is initiated in function block 20 (as described in connection with FIG. 2), the flash memory initialization function "flash init" shown in function block 22 is executed on the DTV board.

Figure 3:
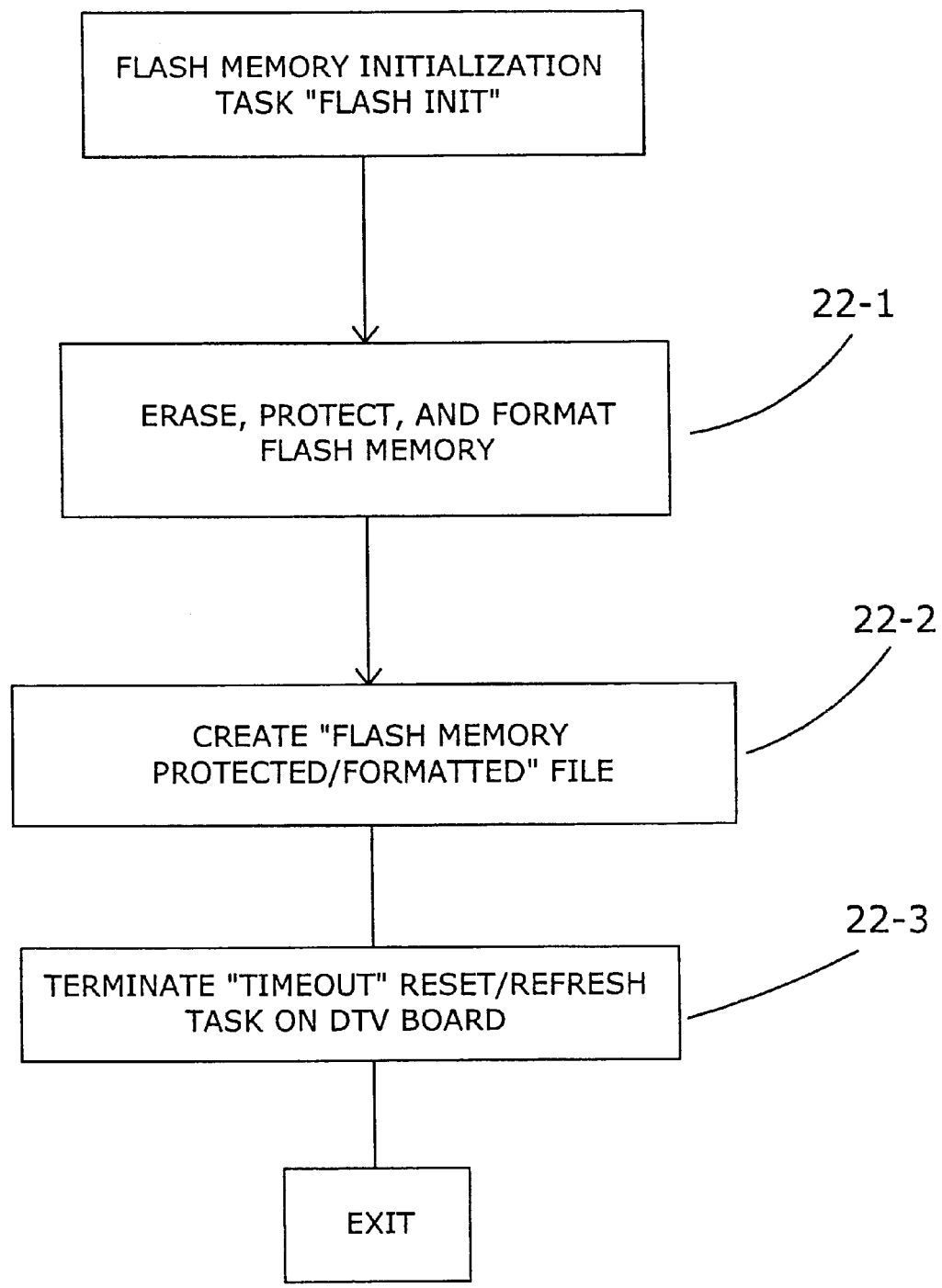
FIG. 3 is a flow diagram of a flash memory initialization task "flash init" illustrated in FIG. 1.

The details of the flash memory initiation function "flash init" 22 of FIG. 1 are shown in FIG. 3. As shown therein, the flash memory is subject to erasure, protection, and formatting in function block 22-1. Thereafter, the "flash memory protected/formatted" file is created in function block 22-2, and, in function block 223, the "timeout termination" command or indication generated for detection by the query 20-5 of FIG. 2. Once the "timeout termination" command or indication is detected by the query 20-5 of FIG. 2, the primary "timeout" task/counter is allowed to time out to generate a 'timed out' indication or interrupt As shown in function block 24 of FIG. 1, the front panel microprocessor awaits interrupts following the starting of the timing tasks in function block 20 and the starting of the "flash init" task in function block 22. (FIG. 3). Thereafter, in decision block 26, a determination is made as to whether or not the primary "timeout" task/counter on the front panel board has timed out. A time out interrupt normally occurs after the "flash init" task is successfully completed to generate the "timeout termination" indication (function block 22-3 in FIG. 3) that causes the query 20-5 in FIG. 2 to allow the primary 'timeout' counter to time out (function block 20-7 in FIG. 2). A time out can also occur in the event the software/firmware on the DTV board does not function properly (i.e., a "crash" or "freeze") so that the periodic refresh/re-set of the primary "timeout" counter/task of block 20-4 (which runs on the DTV board) in FIG. 2 ceases as a consequence of the misfunction.

Once a time out of the primary "timeout" counter/task is detected in query 26 of FIG. 1, function block 28 causes the front panel board to force the DTV board into re-set. Shortly thereafter, the DTV is taken out of reset in function block 12 of FIG. 1 with the boot-up sequence starting the search for the "flash memory protected/formatted" file in function block 14. Since the desired file is now in existence, the query in decision block 16 causes the DTV application to start normally.

The creation of the "flash memory protected/formatted" file can be accompanied by the creation of one or more subdirectories. When the set-top box is turned on, the software tries to open the flash directory and succeeds only if the file has been previously created. In addition to the creation of the "flash memory protected/formatted" file, an flag or other indicia can be utilized as evidence of the creation of the desired file.

One benefit of the providing the primary "timeout" task/counter on the front panel board and the recurring re-set/ refresh task on the DTV board is that a "crash" or "freeze" of the software/firmware on the DTV board will merely allow the primary "timeout" task/counter on the front panel board to time out and force a restart or reboot of the DTV board.

From the standpoint of the user, a start-up sequence that requires initialization or re-initialization of the flash memory may add only a few seconds to the start-up sequence.

As will be apparent to those skilled in the art, various changes and modifications may be made to the illustrated flash memory initialization in a set-top box of the present invention without departing from the spirit and scope of the invention as determined in the appended claims and their legal equivalent.

What is claimed is:

1. A memory initialization sequence for a memory in a DTV set-top box of the type having a front panel function that includes a program-controlled microprocessor and a DTV application function for processing at least part of a audio/visual signal wherein the memory initialization sequence commences upon power-up, comprising the steps of: searching for the presence of a selected file indicative of initialization of the memory; starting a DTV application function if the selected file is present; and effecting a memory initialization routine if the selected file is not present, the memory initialization routine starting a timeout task/counter associated with the front panel function and having a timeout period of M time units and starting a recurring re-set/refresh task associated with the DTV application function having a reset/refresh time period N time units to successively reset/refresh the timeout task/counter, where N is less than M time units, and, concurrent with the operation of said timing task/counter, formatting the memory and creating a file indicative of initialization of the memory, and, after creation of the selected file, terminating the reset/refresh task to allow the timeout task/counter to timeout, and, upon timeout of the timeout task/counter, re-seting the DTV application and thereafter taking the DTV application out of re-set.

2. A method of memory initialization sequence in a memory in a DTV set-top box, the set-top box having a front panel function that includes a program-controlled microprocessor and a DTV application function for processing at least part of a audio/visual signal wherein the memory initialization sequence commences upon power-up, comprising the steps of:

first placing the DTV application function out of reset;

a second step of starting boot-up sequence of DTV application function;

a third step of searching for a file indicating that the memory is at least one of a protected and a formatted file;

if the memory is not the at least one protected and formatted file, a fourth step of starting a timeout task/counter associated with the front panel function and having a timeout period of M time units and starting a recurring re-set/refresh task associated with the DTV application function having a reset/refresh time period N time units to successively reset/refresh the timeout task/counter, where N is less than M time units;

concurrent with the operation of said timing task/counter, formatting the memory and creating a file indicative of initialization of the memory; and a fifth step of terminating the reset/refresh task to allow the timeout task/counter to timeout, and, upon timeout of the timeout task/counter, re-setting the DTV application and thereafter taking the DTV application out of re-set.

3. The method of claim 2, wherein M time units is set to 4 seconds.

4. The method of claim 2, wherein reset/refresh time period N is less than or equal to 2 seconds.

5. The method of claim 2, wherein the memory is a flash memory.

* * * * *